Figure 1:
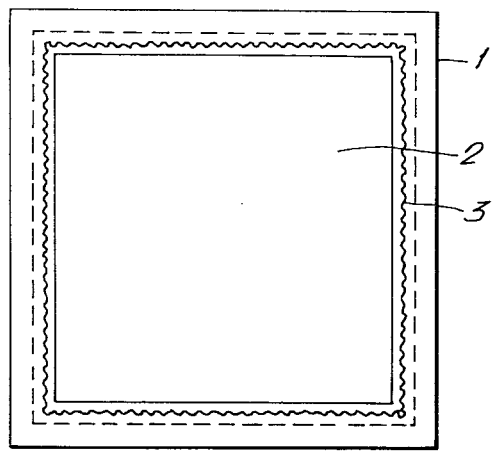

United States Patent [19]

Krause et al.

[11] 4,236,952
[45] Dec. 2, 1980

[54] PRODUCTION OF SHEET MATERIALS

[75] Inventors: Janusz J. H. Krause; Colin Stanier, both of Runcorn, England

[73] Assignee: Imperial Chemical Industries Limited, London, England

[21] Appl. No.: 965,393

[22] Filed: Dec. 1, 1978

[30] Foreign Application Priority Data

Dec. 29, 1977 [GB] United Kingdom ............... 54141/77

[51] Int. Cl.² .................... B32B 7/08; B32B 31/16; D05B 93/02
[52] U.S. Cl. .................... 156/93; 112/403; 112/405; 112/417; 156/155; 156/218; 156/290; 428/104; 428/196; 428/200; 428/201; 428/202; 428/421; 428/422
[58] Field of Search ............... 112/401, 402, 403, 405, 112/417, 418; 156/93, 155, 203, 218, 290; 428/104, 200, 201, 202, 196, 421, 422, 904

[56] References Cited

U.S. PATENT DOCUMENTS

| 2,353,960 | 7/1944 | King ........................... 156/93 X |
| 3,097,618 | 7/1963 | Davis ............................ 156/93 |
| 3,923,630 | 12/1975 | Argade et al. ............. 204/266 |
| 3,949,135 | 4/1976 | Vercauteren ............. 428/422 X |
| 4,113,912 | 9/1978 | Okita ......................... 428/290 |

FOREIGN PATENT DOCUMENTS

| 1126595 | 3/1962 | Fed. Rep. of Germany . |
| 2033830 | 1/1972 | Fed. Rep. of Germany . |
| 2343435 | 3/1975 | Fed. Rep. of Germany . |
| 1505077 | 3/1978 | United Kingdom . |

Primary Examiner—John T. Goolkasian
Assistant Examiner—Robert A. Dawson
Attorney, Agent, or Firm—Cushman, Darby & Cushman

[57] ABSTRACT

A method of joining together a sheet or sheets of an organic polymer which is not normally melt-processable, e.g. polytetrafluoroethylene, the method comprising the steps of
(a) contacting a strip of melt-processable organic polymer, e.g. fluorinated ethylene/propylene copolymer, with the faces of the sheet or sheets in the region of juxtaposed edges of the sheet or sheets,
(b) stitching the strip to the sheet or sheets by means of a thread, and
(c) heating the strip in order to fuse the strip and/or the thread to seal the holes created by the stitching step, and, where the strip has not previously been fused to the faces of the sheet or sheets, in order to fuse the strip to the faces of the sheet or sheets.

Preferably, the thread is of a melt-processable fluorine-containing polymer and a gauze is placed in contact with and stitched to the faces of the sheets opposite from the faces contacted with the strip of melt-processable organic polymer.

The joined sheets, when porous, may be used as diaphragms in electrolytic cells.

12 Claims, 4 Drawing Figures

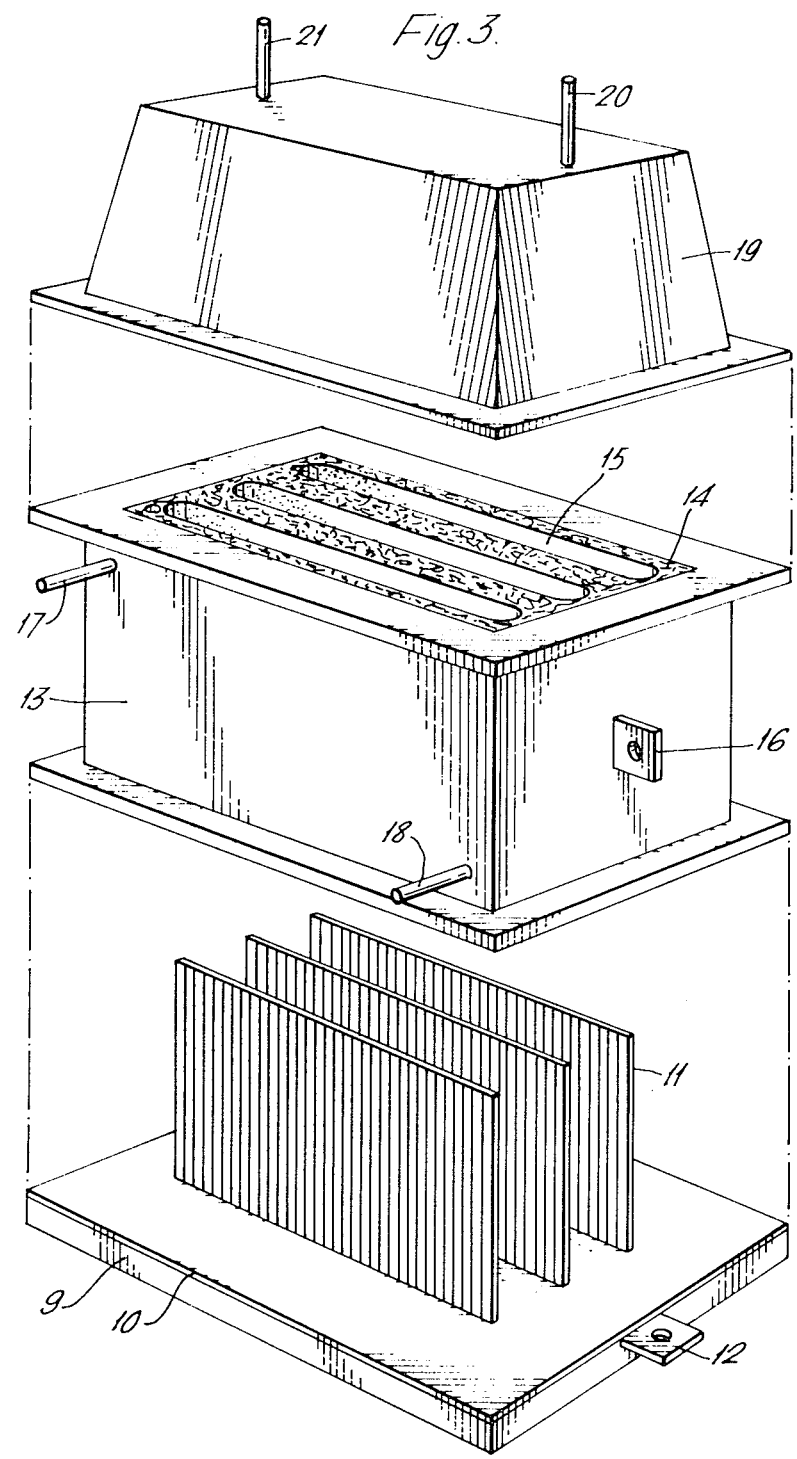

PRODUCTION OF SHEET MATERIALS

This invention relates to the production of sheet materials of an organic polymer which is not normally melt-processable, and in particular to the joining together of a sheet or sheets of such a material.

Sheets of organic polymer may be joined together by placing the sheets together so that the edges of the sheets abut each other, or overlap, and heating the abutting or overlapping portions of the sheets so that the organic polymer flows and the sheets become fused together. Of course this method of joining sheets of organic polymer may be used only where the organic polymer is melt-processable. Where the organic polymer is not normally melt-processable the aforementioned methods of joining together of sheets is not successful, or at most results in formation of only a very weak bond between the sheets as either the organic polymer does not flow sufficiently for the sheets to be fused together or it flows only to a very limited extent. In order to join together sheets of an organic polymer which is not normally melt-processable other methods have to be used.

For example, in our Belgian Patent 830739 we have described a method of manufacturing a porous diaphragm for an electrolytic cell from a plurality of sheets of filled polytetrafluoroethylene, polytetrafluoroethylene being an example of an organic polymer which is not normally melt-processable, which method comprises fusing a melt-processable fluorine-containing polymer, e.g. in the form of a strip, into the sheets at or near juxtaposed edges of the sheets at a temperature which will not substantially decompose the filler in the sheets, and solidifying the melt-processable polymer so as to effect joining of the sheets. In the aforementioned method the joined sheets of filled polytetrafluoroethylene are subsequently treated to remove the filler and thus form a porous diaghragm.

We find that although the aforementioned method may be used to join together sheets of polytetrafluoroethylene, and sheets of other organic polymers which are not normally melt-processable, the strength of the joint which is formed between the sheets may not be as great as may be desired as the strip of melt-processable polymer may tend to pull away from the sheets of non melt-processable polymer.

We have now found a method of joining together sheets of organic polymers which are not normally melt-processable which method results in a joint of greatly improved strength. The method may be applied to sheets of polytetrafluoroethylene and to sheets of polymers other than polytetrafluoroethylene which are not normally melt-processable.

According to the present invention there is provided a method of joining together a sheet or sheets of an organic polymer which polymer is not normally melt-processable, the method comprising the steps of (a) contacting a strip of a melt-processable organic polymer with the faces of the sheet or sheets in the region of juxtaposed edges of the sheet or sheets, (b) stitching the strip to the sheet or sheets by means of a thread in the region of both of the juxtaposed edges of the sheet or sheets, and (c) heating the strip in order to fuse the strip and/or the thread to seal the holes created by the stitching step, and, where the strip has not previously been fused to the faces of the sheet or sheets, in order to fuse the strip to the faces of the sheet or sheets.

Where the holes created by the stitching step are to be sealed by fusing the thread then the thread must be made of a melt-processable organic polymer. The melt-processable polymer of the thread may be the same as or different from that of the strip.

The method of the invention may be used to join a sheet of non melt-processable organic polymer to itself. For example, opposite edges of a sheet of square or oblong shape may be brought together into juxtaposed positions and sealed by the method of the invention to form a tubular or sleeve-like structure. Alternatively, the method of the invention may be used to join together two or more separate sheets of non melt-processable organic polymer, and the invention will be described hereinafter by reference to the joining together of a plurality of such sheets.

The method of the invention may be used to join together sheets of non melt-processable organic polymer which are substantially non-porous. In this case, if the joined sheets are to remain substantially non-porous, it is essential that the holes associated with the stitching step, that is the space between the thread used in the stitching step and the hole created in the strip of melt-processable polymer by the stitching, be sealed by the fusing step. If this fusing step was to be omitted the joined sheets would be porous.

The method of the invention may be used to join together sheets of non melt-processable organic polymer which are porous, or which may subsequently be made porous by removing a removable particulate filler from the joined sheets, for example by one of the processes described in our British Patent Specifications Nos. 1,081,046, 1,424,804 and 1,468,355. In this case also the holes associated with the stitching step should be sealed by the fusing step otherwise the porosity of the sheets may be adversely affected. This is especially the case where the sheets contain very fine pores. The porosity of such sheets would be adversely affected by the relatively large holes created by the stitching step.

The method of the present invention may be applied to join together sheets of organic polymer which are not normally melt-processable, that is which flow at most to only a limited extent on heating so that a strong bond cannot be obtained between the sheets by thermal treatment. Such polymers, even if they melt on heating, often decompose on melting or when heated to a few degrees above their melting point.

On the other hand, by melt-processable organic polymer we mean a polymer which may be fused by the application of heat and which returns to its original form on removal of heat and which also substantially retains its original properties.

The method of the invention may be used to join together sheets of any non melt-processable organic polymer but it is particularly suitable for joining together sheets of a fluorine-containing polymer, particularly sheets of an organic polymer containing units of tetrafluoroethylene, and especially polytetrafluoroethylene. Polytetrafluoroethylene is normally considered to be non melt-processable.

The melt-processable polymer used for the strip and for the thread, where the latter is a melt-processable polymer, is preferably a fluorine-containing polymer, on account of the generally high terminal stability of such polymers. Examples of suitable such polymers include polychlorotrifluoroethylene, polyvinylidene fluoride, fluorinated ethylene/propylene copolymer, and a copolymer of ethylene and chlorotrifluoroethylene.

The sheets may be brought together so that the edge of one sheet of non melt-processable polymer abuts the edge of another sheet, and the strip of melt-processable polymer may be contacted with both sheets, or the sheets may be brought together so that one sheet slightly overlaps the other. Alternatively, the sheets may be placed in face-to-face contact with the edges of the sheets together and the strip of melt-processable polymer may be in the form of a U-shaped strip enclosing the edges of the sheets.

It is generally desirable to fuse the strip of melt-processable polymer to the faces of the sheets in the region of juxtaposed edges of the sheets before effecting the stitching step as the fusing of the strip bonds the sheets together at least to the extent that they can readily be handled. The fusing step may be effected by the application of heat and pressure. The temperature at which the strip of melt-processable polymer is fused to the sheets should be lower than the melting point of the non melt-processable polymer, if any, or lower than the temperature at which substantial decomposition of the latter takes place. Thus, the melting point of the melt-processable polymer should be lower than the melting point, if any, or decomposition point of the non melt-processable polymer. The temperatures and pressures employed depend on the specific melt-processable polymer used for the strip, but we have found that it is convenient to operate at a constant pressure, e.g. of approximately 10 lb/sq in, and to apply an appropriate amount of heat as required. The melt-processable polymer used will clearly be chosen bearing in mind the thermal properties of the non melt-processable polymer.

When the strip of melt-processable polymer has been fused to the faces of the sheets of non melt-processable polymer in the region of juxtaposed edges of the sheets, or has merely been placed in contact with the faces, the strip is stitched to the sheets, that is to both of the sheets in the region of the juxtaposed edges of the sheets.

Any convenient method of stitching may be used. As the thread may shrink on heating it is preferred to use a somewhat "loose" stitch in order to take account of the shrinkage which may occur. It is preferred that the thread be of a melt-processable polymer such that in the fusing step the polymer of the thread flows in order to assist in the sealing of the holes created in the stitching step. It is preferred that the thread and the strip are made from the same melt-processable polymer. In the fusing step it is sufficient that the strip and thread be heated to seal the holes created by the stitching. Excessive heating, resulting in excessive flows of the strip and/or the thread may be undesirable.

The fusing step may also serve to bond the strip of melt-processable polymer to the sheets of non melt-processable polymer where this bonding has not previously been effected.

As the stitching may tend to cut into the sheet of non melt-processable polymer, and may even tend to pull out of the sheet, it is preferred that the faces of the sheets of the latter polymer opposite from the strip be reinforced, for example, by contacting with a gauze and/or with a second strip of melt-processable polymer so that the stitching passes around the fibres of the gauze or through the second strip. Where a gauze is used the type of stitching, and in particular the number of stitches per unit length, will be chosen so that the stitching passes around individual fibres in the particular gauze which is used.

The non melt-processable polymer of the sheets, and the materials of the strip and of the thread used in the stitching, will be chosen bearing in mind the ultimate use of the joined sheets. The joined sheets may have a variety of uses. For example, where the sheets are porous or where they can be made porous by removing a filler from the sheets they may be used as a diaphragm in an electrolytic cell, especially in an electrolytic cell for the production of halogen and caustic alkali by electrolysis of aqueous alkali metal halide solution, e.g. chlorine and caustic soda by electrolysis of sodium chloride solution. Such diaphragms are described for example in our Belgian Pat. No. 829,388 and in our UK Pat. No. 1,081,046.

In such diaphragms it is preferred that the non melt-processable polymer is a fluorine-containing polymer, particularly polytetrafluoroethylene, and that the strip and the thread used in stitching are of a melt-processable fluorine-containing polymer, for example fluorinated ethylene-propylene copolymer, as such polymers are able to withstand the conditions prevailing in electrochemical cells for the production of halogens and caustic alkali.

The invention is illustrated by the following Examples in which all parts are expressed as parts by weight.

EXAMPLE 1

Two sheets of polytetrafluoroethylene containing titanium dioxide and starch were prepared following the procedure described in our UK Patent Specification No. 1,468,355.

To 100 parts of an aqueous dispersion of polytetrafluoroethylene containing 60% by weight of polymer in the form of particles approximately all in the size range 0.15 to 0.2 micron were added 101 parts of water, 60 parts of titanium dioxide of particle size approximately 0.2 micron, 60 parts of maize starch of particle size approximately 13 microns and 120 parts of potato starch of particle size less than 75 microns. The mixture was then stirred with a paddle mixer for 30 minutes to form a substantially uniform paste. This paste was spread on trays and dried at 24° C. for 48 hours to a water content 5.7% by weight. 100 parts of the resultant crumb were mixed with 52 parts of water to form a dough having a viscosity of $4 \times 10^6$ poise. The dough was then spread along the shortest edge of a rectangular piece of card, and calendered on the card between dual, even-speed, calender rolls, set 3 mm apart, into an oblong sheet. After calendering, the oblong sheet was cut, in the direction of calendering, into four equal pieces. These were laid congruently over each other to obtain a four-layered laminate. The card was picked up, rotated 90° in the horizontal plane, and calendered (directed 90° to the original direction of calendering) again through the 3 mm roll separation. This process, the successive cutting into four, stacking, rotating and calendering was repeated until the composition had been rolled a total of five times. The resultant laminate was cut into four, in the direction of calendering, stacked, removed from the card, and calendered, without rotation through 90°, the inter-roll space being reduced by the thickness of the card. After calendering, the laminate was cut, at right angles to the direction of calendering, into four equal pieces, stacked, rotated through 90° and calendered again. This process, cutting at right angles to the direction of calendering, stacking, rotating and calendering was repeated until the composition had been rolled a total of nine times. The resultant essentially rectangular laminate was then passed through the rolls with its largest side directed at 90° to the direction of calendering and with the inter-roll space slightly reduced, no cutting, stacking or rotating through 90° being involved. This process was repeated through a gradually reduced inter-roll space, the same edge of the laminate being fed to the rolls on each occasion, until the thickness of the laminate was 1.5 mm.

Two sheets, prepared as described above, having dimensions 1½ mm thick × 300 mm square, were placed together so that an edge of one sheet abutted against the edge of the other sheet, a 0.25 mm thick 3 cm wide strip of fluorinated ethylene/propylene copolymer was placed on the sheets over the abutting edges, and a gauze made of 0.25 mm diameter monofilament fluorinated ethylene/propylene copolymer was placed under the sheets. The filaments in the gauze were spaced approximately 1½ mm apart.

The strip was then loosely stitched to both of the sheets in lines parallel to the abutting edges of the sheets, and to the gauze, by means of a thread comprising a double thickness of 0.25 mm diameter fluorinated ethylene/propylene copolymer filament. The pitch of the stitches was 3 mm and the stitches passed around the gauze beneath the sheets.

After the strip had been stitched to the sheet the strip was heated to a temperature of 300° C. by means of a nichrome strip resistance heater having a width of 0.63 cm and a thickness of 0.013 cm to fuse the strip to the sheets and to fuse the threads and thereby seal the holes created by the stitching. The strip was then allowed to cool.

The jointed sheets were then used as a diaphragm in an electrolytic cell for the production of chlorine and caustic soda by the electrolysis of sodium chloride brine. The sheet was assembled in an electrolytic cell equipped with a mild steel cathode and a titanium anode coated with a mixture of $RuO_2$ and $TiO_2$ and, following the procedure described in UK Patent Specification No. 1,468,355, the cell was filled with 25% by weight aqueous sodium chloride brine at 60° C., and allowed to stand for 1 hour. After 1 hour the current was switched on. The current density was $2kA/m^2$. At this stage there was no flow of brine through sheet. After 10 hours flow of brine through the sheet commenced and the voltage progressively decreased. Removal of starch from the sheet was followed by analysis of the carbon dioxide in the gaseous chlorine. After 18 hours the level of carbon dioxide reached a constant value indicating that extraction of the starch was complete.

The electrolysis was then continued to produce chlorine in the anode compartment of the cell and hydrogen and caustic soda in the cathode compartment of the cell.

By way of comparison two sheets of polytetrafluoroethylene were joined following the above described procedure except that the stitching step was omitted. The sheets could readily be pulled apart by hand. In contrast, the sheets joined by the method of the invention as described above were very resistant to pulling apart by hand.

EXAMPLE 2

Sheets of polytetrafluoroethylene containing starch and titanium dioxide were prepared following the procedure described in Example 1, except that the sheets had dimensions of 1½ mm thick × 500 mm square. The sheets were assembled into a form suitable for use as diaphragms in electrolytic cells. The sheets and their mode of assembly, and the electrolytic cell are illustrated in the following drawings in which FIG. 1 shows a plan view of a sheet in a modified form suitable for assembly into a diaphragm for use in the cell.

Figure 2:
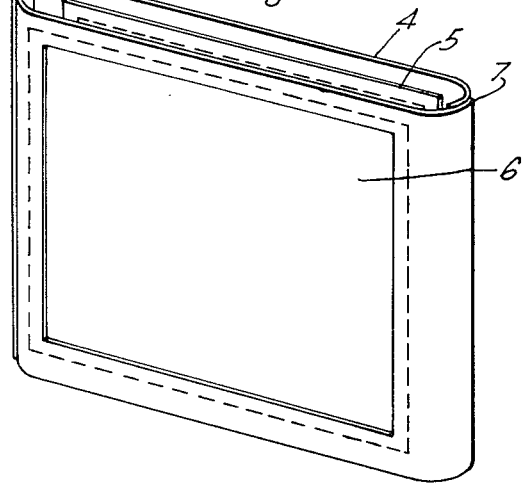
Figure 4:
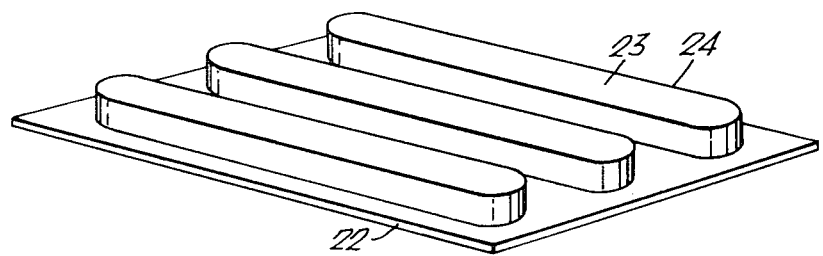

FIG. 2 shows a perspective view of a pair of sheets assembled into a form suitable for use as a diaphragm, FIG. 3 shows an exploded view in perspective of an electrolytic cell, and FIG. 4 shows a perspective view of a part of the electrolytic cell used in positioning the diaphragm in the electrolytic cell.

Referring to FIG. 1 a frame formed of a 0.25 mm thick 30 mm wide strip of fluorinated ethylene/propylene copolymer (1) was placed on top of a 500 mm square sheet of polytetrafluoroethylene (2) prepared as described above with the frame overlapping the internal edge of the sheet to the extent of 1 cm. The sheet was then stitched to the frame by means of a thread comprising a double thickness of 0.25 mm diameter fluorinated ethylene/propylene copolymer filament (3). The pitch of the stitches was 3 mm and the stitches passed around a gauze of fluorinated ethylene/propylene copolymer (not shown) positioned beneath the sheet. A further strip of fluorinated ethylene/propylene copolymer (not shown) was then placed on the frame over the stitches and the strip and frame were heated to a temperature of 300° C. to fuse the strip to the frame and the frame to the sheet, and to fuse the stitches.

Referring to FIG. 2, an assembly (4) in the form of a sleeve suitable for use as diaphragm in an electrolytic cell was formed from two sheets of polytetrafluoroethylene (5,6) which had been fused and stitched to fluorinated ethylene/propylene copolymer following the above described procedure. The sheets were assembled into a form of the sleeve (4) by overlapping the projecting pieces of fluorinated ethylene/propylene copolymer at the edges of the sheets (7,8) and fusing by heating at a temperature of 300° C. For the sake of clarity the stitches are not shown in the embodiment shown in FIG. 2.

Referring to FIG. 3 the electrolytic cell comprises a mild steel base (9) bonded to a titanium baseplate (10) having three upstanding louvred titanium anode plates (11) electrically and mechanically connected thereto.

The louvred anode plates carry a coating of a mixture of ruthenium dioxide and titanium dioxide.

A positive terminal (12) is fixed to the base (9). The cathode box of the cell comprises a mild steel container (13) having positioned therein an assembly of mild steel gauze (14) which serves as a cathode and which is provided with three slots (15) of dimensions height 500 mm, length 500 mm and breadth 30 mm and which in the assembled cell receive the louvred anode plates. The cathode box is provided with a negative terminal (16) and outlet pipes for hydrogen (17) and cell liquor (18) that is, in the case where the cell is used to electrolyse aqueous alkali metal halide solution. The electrolytic cell also comprises a mild steel anolyte header vessel (19) provided with an inlet pipe for electrolyte (20), e.g. aqueous alkali metal halide solution, and an outlet pipe (21) for gaseous products of electrolysis, e.g. chlorine.

A sleeve-like assembly (4) as shown in FIG. 2 is positioned in each of the anode slots (15) of the cathode box and is fixed therein by sealing the strips of fluorinated ethylene/propylene copolymer along the upper and lower edges of the sleeves to mouldings as shown in FIG. 4 positioned above and below the cathode box respectively. The mouldings comprise a sheet of fluorinated ethylene/propylene copolymer (22) having three slots (23) with upstanding lips (24) around the perimeters of the slots. The strips of fluorinated ethylene/propylene copolymer on the sleeves are heat sealed to the lips on the mouldings.

Finally, the electrolytic cell is assembled by positioning the cathode box on the base of the cell with the anodes (11) positioned in the slots (15) of the cathode box and the sleeves (4) between the anodes (11) and the mild steel gauze (14) of the cathode box. The anolyte header vessel (19) is then positioned on the cathode box. Not shown for the sake of simplicity over the sealing gaskets in the electrolytic cell between the cathode box and the base and the anolyte header vessel, and the means for bolting together the various parts of the cell.

Aqueous sodium chloride solution (25% by weight) at a temperature of 60° C. was charged to the anolyte header vessel and the cell was put in load at $2kA/m^2$. The voltage at this stage was 3.4 volts and there was no flow of electrolyte through the polytetrafluoroethylene sleeves. After 10 hours flow of electrolyte commenced and the voltage gradually decreased. After 24 hours the rate of flow of electrolyte through the sleeves ceased increasing and the voltage remained constant at 3.1 Volts indicating that the extraction of the starch from the polytetrafluoroethylene to produce porous diaphragms had been completed.

The electrolysis was carried out for 2 weeks during which time the chlorine gas produced was analysed and was found to comprise 99.2% chlorine. This indicates that the relatively large holes created in the sleeves by the stitching had been sealed otherwise the chlorine would have been contaminated with relatively large proportions of hydrogen.

After two weeks the electrolytic cell was dismantled. Visual inspection did not indicate any imperfections in the joints of the sleeve diaphragms.

We claim:

1. A method of joining together a sheet or sheets of an organic polymer which polymer is not normally melt-processable, the method comprising the steps of
   (a) contacting a strip of melt-processable organic polymer with the faces of the sheet or sheets in the region of juxtaposed edges of the sheet or sheets,
   (b) stitching the strip to the sheet or sheets by means of a thread in the region of both of the juxtaposed edges of the sheet or sheets, and
   (c) heating the strip in order to fuse the strip and/or the thread to seal the holes created by the stitching step, and, where the strip has not previously been fused to the faces of the sheet or sheets, in order to fuse the strip to the faces of the sheet or sheets.

2. A method as claimed in claim 1 in which the thread is made of a melt-processable organic polymer.

3. A method as claimed in claim 1 or claim 2 in which opposite edges of a sheet of non melt-processable organic polymer of square or oblong shape are joined to form a tubular or sleeve-like structure.

4. A method as claimed in claim 1 or claim 2 in which two or more sheets of non melt-processable organic polymer are joined together.

5. A method as claimed in claim 1 in which the sheets of non melt-processable organic polymer are porous.

6. A method as claimed in claim 1 in which the sheets of non melt-processable organic polymer contain a particulate filler which may subsequently be removed from the joined sheets to render the joined sheets porous.

7. A method as claimed in claim 5 in which the non melt-processable organic polymer is a fluorine-containing polymer.

8. A method as claimed in claim 7 in which the fluorine-containing polymer is polytetrafluoroethylene.

9. A method as claimed in claim 1 in which the melt-processable organic polymer is a fluorine-containing polymer.

10. A method as claimed in claim 9 in which the fluorine-containing polymer is a fluorinated ethylene/propylene copolymer.

11. A method as claimed in claim 1 in which the strip of melt-processable organic polymer is fused to the sheet or sheets of non melt-processable organic polymer before effecting the stitching step.

12. A method as claimed in claim 1 in which the faces of the sheet or sheets of the non melt-processable organic polymer opposite from the faces contacted with a strip of melt-processable organic polymer are themselves contacted with a gauze, and in which the stitching passes around the fibres of the gauze.

* * * * *